United States Patent [19]

Scotti et al.

[11] 4,371,451
[45] Feb. 1, 1983

[54] LECITHIN CONTAINING SURFACE RELEASE COMPOSITIONS

[76] Inventors: Frank Scotti, 450 Indian Rd., Wayne, N.J. 07470; Edward H. Page, 1021 Hillcrest Rd., Ridgewood, N.J. 07450

[21] Appl. No.: 347,568

[22] Filed: Feb. 10, 1982

[51] Int. Cl.$^3$ ............................................ C08L 91/00
[52] U.S. Cl. .................... 252/305; 106/244; 426/811
[58] Field of Search ................. 106/244; 252/305; 426/811

[56] References Cited

U.S. PATENT DOCUMENTS

| | | | |
|---|---|---|---|
| 3,661,605 | 5/1972 | Rubin | 106/244 |
| 3,896,975 | 7/1975 | Follmer | 222/191 |
| 3,928,056 | 12/1975 | Szuhaj | 106/243 |
| 4,073,411 | 2/1978 | Doumani | 222/192 |
| 4,073,412 | 2/1978 | Doumani | 222/192 |
| 4,108,678 | 8/1978 | Szuhaj | 106/243 |
| 4,127,419 | 11/1978 | Szuhaj | 106/243 |
| 4,142,003 | 2/1979 | Sejpal | 426/601 |
| 4,155,770 | 5/1979 | Doumani | 106/267 |
| 4,163,676 | 8/1979 | Konigsbacher | 106/243 |
| 4,188,412 | 2/1980 | Sejpal | 426/602 |

*Primary Examiner*—Maurice J. Welsh

[57] ABSTRACT

This application discloses lechithin-based surface release compositions and aerosol containers containing surface release compositions, comprised of water, lecithin, dimethylether and optionally ethanol. The lecithin is dispersed in the aqueous phase of the composition, and an amount of dimethylether is employed as propellant sufficient to propel the lecithin from an aerosol container.

21 Claims, No Drawings

LECITHIN CONTAINING SURFACE RELEASE COMPOSITIONS

FIELD OF THE INVENTION

This invention relates to surface release compositions suitable for dispensing from an aerosol container. This invention also relates to lecithin-based pan spray compositions employing the propellant dimethylether to dispense an aqueous dispersion of lecithin.

BACKGROUND OF THE INVENTION

Lecithin and vegetable oil compositions in aerosol dispensers have been employed as lubricants or antistick coatings for cooking surfaces. Such formulations are applied to a cooking surface such as a pan, casserole, etc. in order to prevent the food from sticking to the heated surface of the pan during the cooking process. A commercial product of this type is PAM which basically comprises an aerosol formulation of vegetable oil containing lecithin dissolved in a mixture of fluorinated propellants. The lecithin or lecithin/vegetable oil is soluble in fluorocarbon propellants and provides a true solution of the lecithin in the propellants. See, e.g., U.S. Pat. No. 2,796,363.

However, prior art aerosol-dispensed lecithin-containing formulations such as those disclosed by U.S. Pat. No. 2,796,363 employ Freon or similar normally gaseous fluorocarbons, under substantial pressure as propellants. Due to Federal legislation which has greatly restricted the use of fluorocarbon propellants, there has been a need in the art for aerosol dispensable lecithin formulations which do not utilize a fluorocarbon propellant, and yet provide a nonflammable, quick-drying and thin coating of lecithin which does not foam when applied to cooking surfaces.

It is, therefore, an object of the present invention to provide a lecithin-based aerosol composition which may be dispensed from conventional pressurized aerosol containers to provide a quick-drying, thin, even film, which is non-foaming, nonflammable and imparts anti-stick properties to cookware or to other surfaces to which it may be applied.

BRIEF DESCRIPTION OF THE INVENTION

In accordance with the foregoing objectives, this invention provides a cookware surface release composition comprising water, lecithin and dimethylether adapted to be dispensed under dimethylether propellant pressure from an aerosol container, with the lecithin being dispersed in a solution of dimethylether and water, and the dimethylether being present in an amount sufficient to propel the lecithin dispersion from an aerosol container and onto a cookware surface without foaming.

The surface release compositions of this invention may also include ethanol as an ingredient of the formulation, and when ethanol is employed, this invention provides a surface release composition comprised of water, ethanol, dimethylether and lecithin adapted to be dispensed from an aerosol container, wherein the lecithin is dispersed in a solution of dimethylether in aqueous ethanol, with the dimethylether being present in an amount sufficient to propel the lecithin dispersion from a container and onto a cookware surface to provide a coated cookware surface upon which food may be prepared without any appreciable sticking of the food to the cookware surface.

The invention also provides aerosol compositions employing dimethylether to propel either the ethanol-free or ethanol-containing surface release composition described above.

DETAILED DESCRIPTION OF THE INVENTION

The present invention provides a coating composition suitable for dispensing from a conventional aerosol container which is an aqueous-dimethylether dispersion of lecithin. Such formulations typically contain a minor amount, usually less than about 15 weight percent of the total formulation of lecithin. For example, the lecithin content of the formulation may be within the range of about 3 to 15% by weight, preferably about 5 to 10% by weight of the total composition.

Typical formulations comprise by weight about 3% to about 15% lecithin, about 7% to about 60% water, and about 30% to about 85% dimethylether. Preferred formulations comprise about 5% to about 10% lecithin, about 20% to about 50% water, and about 25% to about 75% dimethylether. For example, formulations may comprise about 5 to 10% lecithin, about 20 to 25% water and about 25 to 75% dimethylether. The lecithin component of the formulation preferably comprises by weight about 30% to about 95% phosphatide solids, and most preferably about 50% to about 54% phosphatide solids in an edible diluent, e.g., soybean or another vegetable oil. The weight ratio of water to dimethylether in such compositions may be from about 2:1 to about 1:4.5, and preferably about 2:1 to about 1:3.5. All percentages recited in this specification are weight percents of the total composition, unless otherwise expressly indicated.

Food-grade lecithin may be obtained from soybeans. It is a complex mixture of acetone-insoluble phosphatides which consist chiefly of phosphatidyl choline, phosphatidyl ethanolamine, phosphatidyl serine, and phosphatidyl inositol, combined with various amounts of other substances such as triglycerides, fatty acids, and carbohydrates. Refined grades of lecithin may contain any of these components in varying proportions and combinations depending on the type of fractionation used. Lecithin, in its oil-free form, refers to lecithin products wherein the preponderance of triglycerides and fatty acids is removed, and such lecithin products may contain 90% or more of phosphatides, representing all or certain fractions of the total phosphatide complex.

The consistency of both natural grades and refined grades of lecithin may vary from plastic to fluid, depending upon free fatty acid and soybean oil content, and the presence or absence of other diluents. Its color varies from light yellow to brown depending upon whether it is bleached or unbleached. It is odorless or has a characteristic, slight nut-like odor and a bland taste. Edible diluents such as cocoa butter or vegetable oils, often replace soybean oil, and such edible diluents may be combined with the lecithin to improve the functional and flavor characteristics of the product. Lecithin is only partially soluble in water, but readily hydrates to form emulsions.

The oil-free phosphatides are soluble in fatty acids, but are practically insoluble in fixed oils. When all soy phosphatide fractions are present, lecithin is partially soluble in alcohol, and practically insoluble in acetone. The acetone-insoluble matter (phosphatides) is not less than 50%. The acid value is not more than 36. Benzene-insoluble matter is not more than 0.3%. Water is not more than 1.5%.

Natural lecithin is available commercially in a number of grades containing about 50 to 54% of phosphatide solids dissolved in soybean oil, varying in viscosity from very fluid to plastic (heavy bodied) and may be bleached or unbleached. Hydroxylated lecithin is lecithin which has been modified to increase lecithin's hydrophilic properties and may contain 66 to 72% phosphatides. Powdered and granular lecithin is substantially free of soybean oil and is produced from natural lecithin or lecithin fractions and may contain 95% phosphatides.

The term lecithin as employed herein refers to any natural or refined grade of lecithin. For example, suitable lecithin components may be comprised of about 30 to about 95% phosphatide solids derived from soybean oil combined with about 5% to about 65% of edible diluents such as fatty acids, triglycerides, carbohydrates, vegetable oils, cocoa butter or mixtures thereof. Preferred lecithin components comprise from about 40% to 65%, most preferably about 50% to about 52%, phosphatide solids in combination with the edible diluents mentioned above. For example, a suitable lecithin component of the formulation may comprise about 50% to about 54% phosphatide solids dissolved in a vegetable oil, such as soybean oil. In addition to soybean oil, the phosphatide solids of the lecithin component may be combined with oils such as cottonseed oil coconut oil (or butter), palm nut oil, safflower oil, sesame oil, or the glyceryl esters of lauric, linoleic acid, oleic acid, their lightly hydrogenated derivatives, etc. The oils employed may also include antioxidants such as butylated hydroxyanisole (BHA), propylgallate, or tertiary-butyl-hydroxyaquinone (TBHQ).

The composition of the present invention is suitable for use in a conventional aerosol dispenser, and for such use is pressurized by the propellant dimethylether. Dimethylether dissolves in water and water-alcohol solutions to form nonflammable solutions which readily disperse the lecithin component. Sufficient dimethylether is used to pressurize the composition to a normal aerosol composition pressure, e.g., about 20–60 psig. and more usually to 30–50 psig.

Dimethylether is soluble in water to the extent of about 35% at ambient temperatures. However, in the presence of about 5% ethanol, dimethylether and water are mutually compatible. Advantageously, the water and water/ethanol formulations of the present invention provide compositions which, when expelled from aerosol containers, provide a flat, even and unfoamed surface on cookware surfaces.

Typical formulations including ethanol as an ingredient of the composition comprise about 3% to about 20% lecithin, about 4% to about 25% ethanol, about 27% to about 70% dimethylether, and about 15% to about 60% water. Preferred ethanol-containing formulations comprise about 10% to about 20% ethanol, about 5% to about 10% lecithin, about 35% to about 60% dimethylether and about 20% to about 50% water. In such formulations, the weight ratio of the combination of water and ethanol to the dimethylether propellant is preferably in the range of about 1:0.4 to about 1:2.5, and most preferably about 1:0.5 to about 1:2. When the ratio of ethanol and water to dimethylether is too low, for example, about 1:0.3 or less, the anti-stick properties of the ethanol-containing formulations are poor in comparison to formulations having the preferred ratios set forth above.

The ethanol component may be 95% ethanol or the ethanol used may be 190° and 200° proof which conforms with United States Pharmacopoeia (U.S.P.) standards for alcohol and dehydrated alcohol, respectively. Ethanol of 200 U.S. proof degrees at 60° F. has a specific gravity of 0.79365, is 100% by weight ethyl alcohol and contains no water. Ethanol of 190 U.S. proof degrees at 60° F. has a specific gravity of 0.81582, is 92.423% by weight of ethyl alcohol and contains 7.577% by weight of water. The 190° proof ethanol may be made by mixing 95 parts by volume of ethyl alcohol with 6.18 parts by volume of water. A shrinkage of volume occurs by mixing and results in 100 parts of 190° proof ethanol.

Ethyl alcohol denatured with a GRAS classified food grade denaturant, as for example S.D.A. 29-3, can be used in the practice of the invention. S.D.A. 29-3 contains 99% ethyl alcohol and 1% ethyl acetate as denaturant.

The invention will be described further with reference to the following detailed examples.

EXAMPLE 1

5.0 grams of commercial lecithin product, Centrophase C, Central Soya Co., Illinois, comprised by weight of 52% phosphatide solids, 47.3% soybean oil and 0.7% moisture, as well as 10 grams of ethanol (95%) and 50 grams of water were added to a 100 c.c. Fisher Porter Tube, manufactured by Fischer Scientific Co. The order of addition was as given, i.e., lecithin, ethanol and then water. After the addition, the tube was sealed and 35 grams of dimethylether was introduced through the valve in the Fisher Porter Tube. The viscosity of the lecithin component of this example is 1,000 centipoise (Brookfield at 25° C.), the pour point is −6° C., color (Gardner) 13, smoke point 177° C., pH (1% solution) is 6.8 and density at 25° C. is 0.998 g/cc.

EXAMPLE 2

Following the procedure of Example 1, the formulations listed in the following table were prepared.

TABLE I

FORMULATIONS (EXAMPLES 1-10)

| Ingredients | Formulation | | | | |
|---|---|---|---|---|---|
| | Example 1 | Example 2 | Example 3 | Example 4 | Example 5 |
| Lecithin* | 5 | 10 | 10 | 5 | 10 |
| Water | 50 | 35 | 20 | 25 | 20 |
| DME** | 35 | 35 | 70 | 70 | 60 |
| 95% Ethanol | 10 | 20 | — | — | 10 |
| | Example 6 | Example 7 | Example 8 | Example 9 | Example 10 |
| Lecithin* | 5 | 5 | 5 | 5 | 5 |
| Water | 25 | 65 | 75 | 55 | 10 |
| DME** | 65 | 20 | 20 | 20 | 85 |
| 95% Ethanol | 5 | 10 | — | 20 | — |

*The lecithin employed is Centrophase C, Central Soya Co., Ill., comprised of about 52% by weight phosphatide solids in 47.3% soybean oil and .7% moisture.
**dimethylether.

EXAMPLE 11

Each of the formulations of Examples 1-10 given in Table I was evaluated for its anti-stick properties, appearance of composition, type of spray, appearance on pan when sprayed, and flammability characteristics. The evaluations were conducted as follows:

(a) Anti-Stick Properties

In order to evaluate this property of the composition, a 12-inch frying pan was sprayed for 2-3 seconds, and two scrambled eggs were prepared in the pan. If any sticking of the egg on the pan surface was noted, the sample was rated as poor. If no sticking was observed, the sample was rated as good. Even for formulations rated "poor" some anti-stick properties were noted for each of the formulations tested.

(b) Appearance of Composition

After preparation each of the samples was viewed through the Fisher Porter tube in order to assess the homogeneity of the samples. Each of the samples 1-10 was observed to be a milky dispersion of the lecithin in the aqueous dimethylether phase. On standing, the dispersions separated with the lecithin either settling to the bottom or rising to the top of the tube.

(c) Viscosity

Viscosity was roughly assessed by inverting the Fisher Porter tube and visually observing the flow of the formulation in the tube. The viscosity of each formulation was observed to be low (there was an instantaneous flow of material in the Fisher Porter tube upon inversion).

(d) Type of Spray and Appearance on Pan

Each of the formulations 1-10 was sprayed onto a 12-inch frying pan from the Fisher Porter tube using a Precision Valve with an 0.013 stem, an 0.018 body and an 0.013 vapor tap. A one-piece 0.013 mechanical break-up button was used. The following standards were employed:

| Type of spray: | dry, medium, coarse |
|---|---|
| Appearance on pan: | fine droplets, medium droplets, coarse droplets |

(e) Flammability

Each of the samples 1-10 was sprayed through a flame source. If any flame projection was observed, the sample was rated as flammable.

Table II summarizes the properties of formulations 1-10, evaluated in the manner described above.

TABLE II

|  | Formulation No. | | | | |
|---|---|---|---|---|---|
|  | 1 | 2 | 3 | 4 | 5 |
| Anti-Stick Properties | Good | Good | Good | Good | Good |
| Appearance of Composition | Milky | Milky | Milky | Milky | Milky |
| Viscosity | Low | Low | Low | Low | Low |
| Type of Spray | Dry | Dry | Dry | Dry | Dry |
| Appearance on Pan | FD* | FD* | FD* | FD* | FD* |
| Flammability | NF** | NF** | NF** | NF** | NF** |
|  | 6 | 7 | 8 | 9 | 10 |
| Anti-Stick Properties | Good | Poor | Poor | Poor | Good |
| Appearance of Composition | Milky | Milky | Milky | Milky | Milky |
| Viscosity | Low | Low | Low | Low | Low |
| Type of Spray Appearance | Dry | Coarse | Coarse | Coarse | Dry |

TABLE II-continued

|  | Formulation No. | | | | |
|---|---|---|---|---|---|
| on Pan Flammability | FD* NF** | Blotchy NF** | Blotchy NF** | Blotchy NF** | FD* Flammable |

*FD refers to fine droplets
**NF refers to nonflammable

This invention has been described in terms of specific embodiments set forth in detail herein. It should be understood, however, that these are by way of illustration only and that the invention is not necessarily limited thereto. Modifications and variations will be apparent from this disclosure and may be resorted to without departing from the spirit of this invention, as those of skill in the art will understand. Accordingly, such variations and modifications of the disclosed embodiments are considered to be within the scope of this invention and the following claims.

I claim:

1. A cookware surface release composition comprising water, lecithin, and dimethylether adapted to be dispensed under dimethylether propellant pressure from an aerosol container, wherein the lecithin is dispersed in a solution of the dimethylether and water, and the dimethylether is present in an amount sufficient to propel the lecithin dispersion from an aerosol container and onto a cookware surface without foaming.

2. The composition according to claim 1 wherein the lecithin is comprised of about 30 to about 95% by weight phosphatide solids derived from soybean oil in an edible diluent.

3. The composition according to claim 2 wherein said composition comprises by weight about 3% to about 15% of said lecithin, about 7% to about 60% water, and about 30% to about 85% dimethylether.

4. The composition according to claim 1 wherein said composition comprises by weight about 5% to about 10% lecithin, about 20% to about 25% water, and about 70% to about 75% dimethylether.

5. The composition according to claim 4 wherein the lecithin is comprised of about 50% to about 54% by weight of phosphatide solids in soybean oil.

6. The composition according to claim 1, 2, 4 or 5 wherein the weight ratio of water to dimethylether in said composition is about 2:1 to about 1:3.5.

7. The composition according to claim 1 wherein said composition further includes ethanol, and said lecithin is dispersed in the resultant solution of dimethylether and aqueous ethanol.

8. The composition according to claim 7 wherein said composition comprises by weight about 4% to about 25% ethanol.

9. The composition according to claim 7 wherein said composition comprises by weight about 3% to about 20% lecithin, about 4% to about 25% ethanol, about 27% to about 70% dimethylether and about 15% to about 60% water.

10. The composition according to claim 7 wherein said composition is comprised by weight of about 10% to about 20% ethanol, about 5% to about 10% lecithin, about 35% to about 60% dimethylether and about 20% to about 50% water.

11. The composition according to claim 7, 8 or 10 wherein the weight ratio of water and ethanol to dimethylether is about 1:0.4 to about 1:2.5.

12. The composition according to claim 7, 8 or 10 wherein the weight ratio of ethanol and water to dimethylether is about 1:0.5 to about 1:2, and the lecithin is comprised of about 50% to about 54% phosphatide solids in vegetable oil.

13. The composition according to claim 4 or claim 10 wherein said lecithin is comprised of about 52% phosphatide solids by weight dissolved in soybean oil.

14. An aerosol composition comprising an aerosol container containing a cookware surface release composition comprised of a dispersion of lecithin in an aqueous solution of dimethylether which is adapted to be dispersed under dimethylether propellant pressure from the aerosol container and onto a cookware surface without foaming to provide a coated surface on said cookware to which food will not stick during cooking.

15. The composition according to claim 14 wherein said release composition comprises by weight about 5% to about 10% lecithin, about 20% to about 25% water, and about 70% to about 75% dimethylether.

16. The composition according to claim 15 wherein said lecithin is comprised of about 52% by weight phosphatide solids in soybean oil.

17. The composition according to claim 15 or 16 wherein the weight ratio of dimethylether to water is about 1:2.5 to about 1:3.8.

18. The composition according to claim 14 wherein said release composition further includes ethanol, and the lecithin is dispersed in a solution of ethanol, dimethylether and water.

19. The aerosol composition according to claim 18 wherein said release composition comprises by weight about 10% to about 20% ethanol, about 5% to about 10% lecithin, about 35% to about 60% dimethylether and about 20% to about 50% water.

20. The aerosol composition according to claim 19 wherein the lecithin is comprised of about 52% by weight of phosphatide solids in soybean oil.

21. The aerosol composition according to claim 18, 19 or 20 wherein the weight ratio of water and ethanol to dimethylether is about 1:0.5 to about 1:2.

* * * * *